(12) United States Patent
Burdge et al.

(10) Patent No.: US 6,415,079 B1
(45) Date of Patent: Jul. 2, 2002

(54) OPTICAL FIBER GRATINGS HAVING INTERNAL GAP CLADDING FOR REDUCED SHORT WAVELENGTH CLADDING MODE LOSS

(75) Inventors: Geoffrey L. Burdge, Edgewater, MD (US); Benjamin J. Eggleton, Summit, NJ (US); Thomas A. Strasser, Warren, NJ (US); Paul S. Westbrook, Chatham, NJ (US); Robert S. Windeler, Annadale, NJ (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 09/519,382

(22) Filed: Mar. 3, 2000

(51) Int. Cl.$^7$ ................................................ G02B 6/34
(52) U.S. Cl. ........................................................ 385/37
(58) Field of Search ..................................... 385/37–43

(56) References Cited

U.S. PATENT DOCUMENTS

| | | | |
|---|---|---|---|
| 5,907,665 A | 5/1999 | DiGiovanni et al. | |
| 6,169,830 B1 * | 1/2001 | Kewitsch et al. | ............. 385/37 |
| 6,169,831 B1 * | 1/2001 | Adams et al. | ................. 385/37 |
| 6,236,782 B1 * | 5/2001 | Kewitsch et al. | ............. 385/43 |
| 6,266,463 B1 * | 7/2001 | Laming et al. | ................ 385/37 |

OTHER PUBLICATIONS

Dong, L. et al., "Optical Fibers with Depressed Claddings for Suppression of Coupling into Cladding Modes in Fiber Bragg Gratings", *IEEE Photonics Technology Letters*, vol. 9, No. 1, Jan. 1997, pp. 64–66.

Brilland, L., et al., "Slanted Gratings UV–written in Photosensitive Cladding Fibre", *Electronics Letters*, Feb. 4th, 1999, vol. 35, No. 3, pp. 234–235.

Haggans, C.W., et al., "Narrow–Band Rejection Filters with Negligible Backreflection Using Tilted Photoinduced Gratings in Single–Mode Fibers", *IEEE Photonics Technology Letters*, vol. 10, No. 5, May 1998, pp. 690–692.

Poulsen, T., "Bragg Grating Induced Cladding Mode Coupling Caused By Ultra–Violet Light Absorption", *Electronics Letters*, vol. 34, No. 10, May 14, 1998, pp. 1007–1009.

Hewlett, S.J. et al., "Cladding–mode Coupling Charateristics of Bragg Gratings in Depressed–cladding Fibre", *Electronics Letters*. vol. 31, No. 10, May 11, 1995, pp. 820–822.

\* cited by examiner

*Primary Examiner*—Akm E. Ullah
(74) *Attorney, Agent, or Firm*—Lowenstein Sandler PC

(57) ABSTRACT

The present invention is predicated on applicants' discovery that an appropriately spaced and dimensioned internal gap cladding can substantially reduce short wavelength cladding mode loss in a fiber Bragg grating. A fiber Bragg grating is provided with a ring of closely spaced, longitudinally extending gap regions in the glass peripherally surrounding the core. The gaps are spaced apart by thin glass webs having a thickness less than a wavelength of the light being transmitted and are disposed peripherally about the core at a distance of 2–10 wavelengths from the core center. The thin webs limit the passage of the light between the gaps. The combination of webs and gaps acts as an internal thin cladding which supports fewer cladding modes than conventional glass cladding and, significantly, provides increased wavelength spacing between the Bragg resonance and the first cladding mode resonance.

12 Claims, 4 Drawing Sheets

OPTICAL FIBER GRATINGS HAVING INTERNAL GAP CLADDING FOR REDUCED SHORT WAVELENGTH CLADDING MODE LOSS

FIELD OF THE INVENTION

This invention relates to optical fiber Bragg gratings and, in particular, to a fiber Bragg grating provided with a ring of longitudinally extending gap regions (voids) spaced around the core to reduce short wavelength cladding mode loss.

BACKGROUND OF THE INVENTION

Optical fiber Bragg gratings are critical components in WDM communication systems. They perform several key applications including add/drop filtering, band filtering, and dispersion compensation. In these applications the grating is typically used as a reflective filter. Incident light within the stopband of the grating is strongly reflected whereas light outside the stopband is transmitted. An ideal Bragg grating would possess a rectangular amplitude filter function; the reflection would be unity within the stopband and negligible outside the stopband.

In practice, an important limitation on a realistic optical fiber Bragg grating is cladding mode loss on the short wavelength side of the main reflection band. This short wavelength cladding mode loss is caused by grating induced coupling from the core mode into backward propagating cladding modes. The cladding mode loss is seen in the transmission spectrum as sharp resonances on the short wavelength side of the Bragg resonance. The magnitude of the loss scales approximately with the square of the strength of the grating, and the loss is dramatically exacerbated when many gratings are cascaded. It thus imposes strict limitations on the design of optical networks that use grating based technologies.

Several approaches have been proposed for reducing Bragg grating coupling into claddings. A first approach is to surround the fiber with a lossy polymer material that has a refractive index near that of the glass. In this case the cladding mode extends into the polymer where it is absorbed, and thus core-cladding mode coupling is reduced. The cladding mode spectrum is reduced closer to the radiation limit, typically by a factor of 4–5. This loss is acceptable for many applications but can still limit the number of devices that can be cascaded.

Another approach uses a depressed cladding design proposed by Dong et al. [L. Dong, L. Reekie, J. L. Cruz, J. E. Caplen, J. P. de Sandro and D. N. Payne, "Optical fibers with depressed claddings for suppression of coupling into cladding modes in fiber Bragg gratings," IEEE Photonic Technology Letters, vol. 9, page 64–66 (1997)]. A conventional fiber core is surrounded by a down-doped region, typically using boron to achieve the down doping. The depressed cladding region suppresses the overlap of lower order cladding modes with the core. The transverse oscillations are stretched in the depressed cladding region, since the traverse resonance condition is associated with the optical path length (distance times refractive index). This approach has been demonstrated with moderate success. But it is limited by the amount that the index can be reduced in the depressed cladding region.

A third approach is to increase the offset of the cladding mode loss from the Bragg resonance. This is achieved by increasing core refractive index, such that the core mode effective index is substantially above that of the lowest order cladding mode. The result is that the cladding mode resonances are offset from the Bragg resonance. Various groups have demonstrated this effect, where typically a fiber with $\Delta \sim 2\%$, and a core diameter of $d \sim 2\ \mu m$, is used, resulting in an offset of ~2–5 nm. Although the principle has been demonstrated, the usable bandwidth is still limited by the onset of cladding mode loss. In addition there is a significant penalty incurred due to mode mismatch between the grating fiber and the transmission fiber.

The cladding mode loss can also be reduced by incorporating photosensitive material into the cladding of the fiber (E. Delevaque et al. "Optical fiber design for strong gratings photoimprinting with radiation mode suppression," OFC'95, PD5, USA, 1995 and K. Oh et al., Suppression of cladding mode coupling in Bragg grating using $GeO_2B_2O_3$ doped photosensitive cladding optical fiber, *Electronic Letters*, vol. 35, page 423–424 (1999)). In this case, after UV exposure the grating region extends into the cladding region. The reduction in the cladding mode loss follows from the mode orthogonality condition. Hence if the core and the cladding have the same UV sensitivity, there is no blaze and the exposure through the fiber is uniform. Thus the grating will give negligible coupling to the cladding modes. A disadvantage of this scheme is a net reduction in the grating strength due to absorption in the photosensitive cladding region. There is also an increased coupling to asymmetric modes because of the increased asymmetry in the region where these modes have a large mode field strength.

It is also pertinent background that optical fibers have been made with internal longitudinally extending gaps (openings) in the cladding and gratings have been made with such fibers. See U.S. Pat. No. 5,802,236 issued to D. J. DiGiovanni et al. on Sep. 1, 1998 entitled "Article Comprising A Microstructured Optical Fiber and Method of Making Such a Fiber" and U.S. Pat. No. 5,907,652 issued to D. J. DiGiovanni et al. on May 25, 1999 entitled "Article Comprising An Air Clad Optical Fiber"both of which are incorporated herein by reference. These patents have not addressed the problem of reducing short wavelength cladding mode loss.

Accordingly there is a need for an improved fiber design which can effectively eliminate cladding mode loss in fiber Bragg gratings.

SUMMARY OF THE INVENTION

The present invention is predicated on applicants' discovery that an appropriately spaced and dimensioned internal gap cladding can substantially reduce short wavelength cladding mode loss in a fiber Bragg grating. A fiber Bragg grating is provided with a ring of closely spaced, longitudinally extending gap regions in the glass peripherally surrounding the core. The gaps are spaced apart by thin glass webs having a thickness less than a wavelength of the light being transmitted and are disposed peripherally about the core at a distance of 2–10 wavelengths from the core center. The thin webs limit the passage of the light between the gaps. The combination of webs and gaps acts as an internal thin cladding which supports fewer cladding modes than conventional glass cladding and, significantly, provides increased wavelength spacing between the Bragg resonance and the first cladding mode resonance.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for illustrating the concepts of the invention and, except for the graphs, are not to scale.

DETAILED DESCRIPTION

Figure 1:
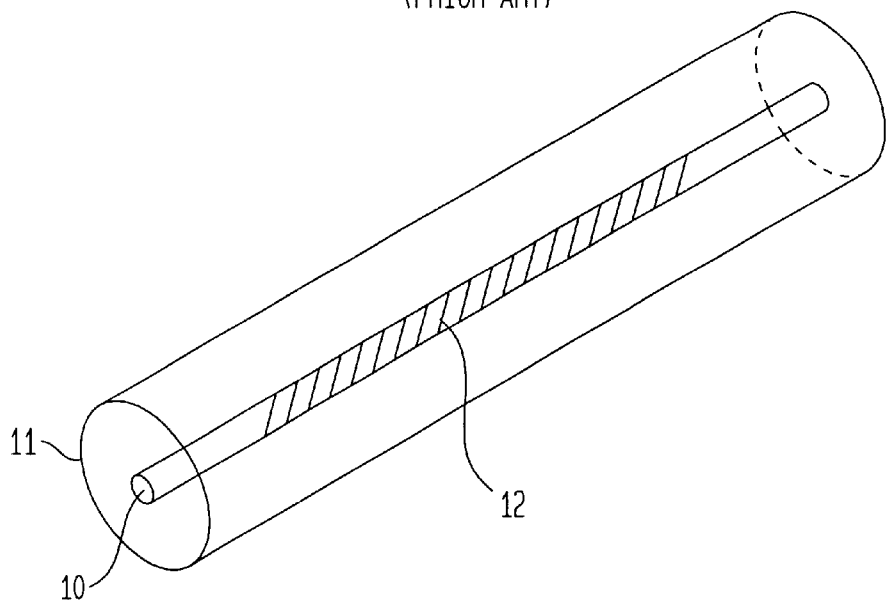
FIG. 1, which is prior art, is a schematic illustration of a conventional optical fiber grating.

Referring to the drawings, FIG. 1 schematically illustrates a conventional optical fiber grating useful in understanding the problem to which the invention is directed. The grating comprises a core 10 and a surrounding glass cladding 11. The core is typically doped silica and includes a plurality of index perturbations 12 periodically induced along its length by ultraviolet radiation. The core radius can be 3 $\mu$m, the cladding diameter 125 $\mu$m, and the index differential between core and cladding $\Delta n=0.01$. The index differential between the core and an index perturbation is typically on the order of 0.0001. A typical grating period is on the order of 531.9 nm and a typical grating length is 4 cm.

In operation, when light of wavelength in the range 1500–1600 nm is transmitted into the grating, a Bragg resonance wavelength will be strongly reflected. But, in addition, there will be an unwanted loss of wavelengths shorter than the Bragg resonance due to coupling into back-propagating cladding modes.

Figure 2:
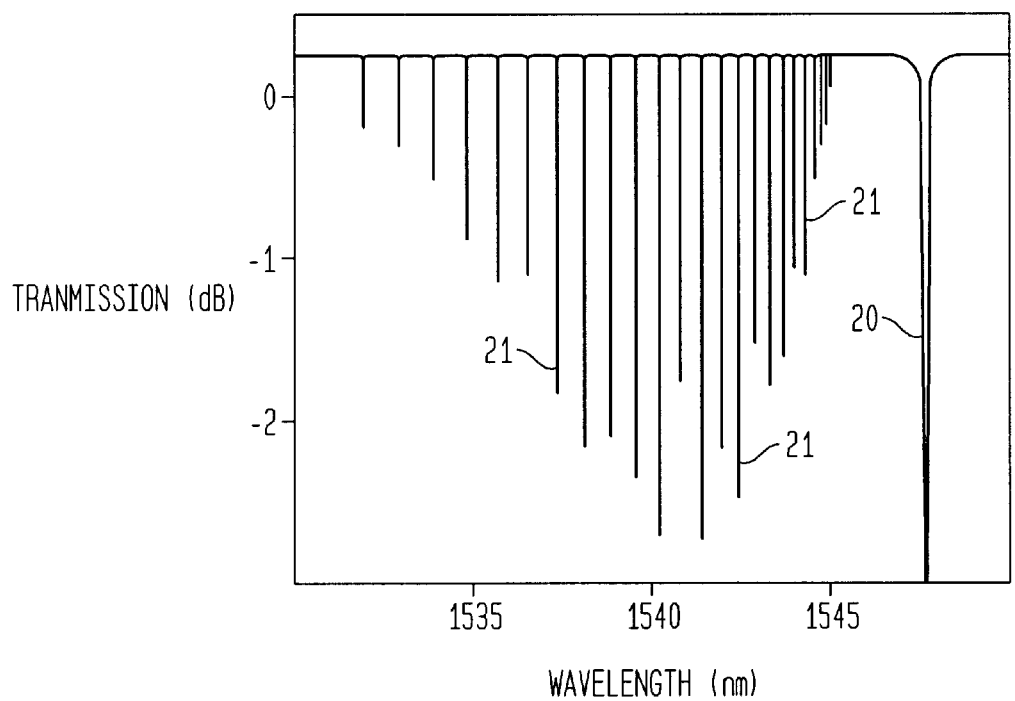
FIG. 2 is a graphical representation of the transmission characteristic of the optical fiber grating of FIG. 1 useful in understanding the problem to which the invention is directed.

FIG. 2 illustrates the transmission characteristic of the FIG. 1 device, showing the main Bragg resonance 20 and the short wavelength cladding loss resonances 21. It is noteworthy that the closely spaced cladding mode resonances begin only 3 nm short of the main Bragg resonance 20 and extend down beyond 1530 nm. These cladding mode losses limit the useful bandwidth of the Bragg filter.

Analytically, it can be shown that the $\Delta\lambda_m$ spacing between the $M^{th}$ and $(m+1)^{th}$ cladding mode resonances can be approximated by:

$$\Delta\lambda_m \propto \frac{\lambda_o^2}{D_{clad}^2}[1+2m]\Lambda_{Bragg}$$

where $\lambda_o$ is the wavelength, n is the refractive index of the cladding, $D_{clad}$ is the diameter of the cladding, m is the order of the cladding mode resonance and $\Lambda_{Bragg}$ is the period of the Bragg grating.

Of particular interest is the wavelength spacing between the fundamental Bragg resonance and the first cladding mode resonance. This is given by:

$$\Delta\lambda_1 \propto \frac{\lambda_o^2}{D_{clad}^2}\Lambda_{Bragg}$$

Since $\Delta\lambda_m$ and $\Delta\lambda_1$ are inversely proportional to $D_{clad}^2$, both can be increased by decreasing the cladding diameter. However a reduction in cladding diameter below that used for conventional transmission fiber substantially decreases the robustness of the fiber and makes it more susceptible to mechanical failure.

Figure 3:
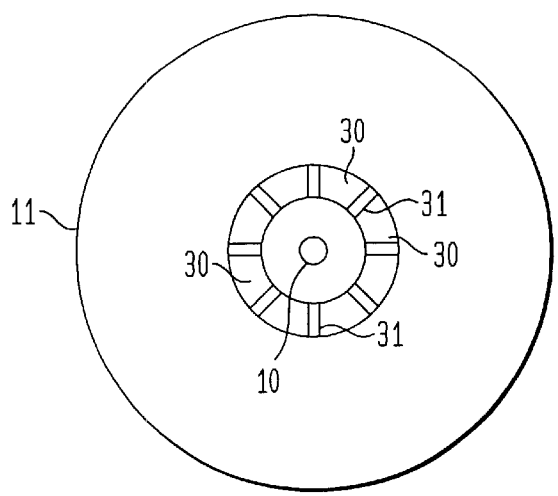
FIG. 3 is a schematic cross section of an improved optical fiber grating in accordance with the invention.

FIG. 3 schematically illustrates the cross section of an improved optical fiber Bragg grating 9 in accordance with the invention. Here the cladding glass 11 is provided with a plurality of longitudinally extending internal gaps or voids 30 peripherally surrounding the core 10. The gaps are closely spaced to prevent light from passing between them. The gaps are spaced from the core and dimensioned to form a interior cladding about the core which is thin compared to the glass cladding, i.e. it provides a much smaller cladding diameter $D_{clad}$. This increases the cladding mode spacing $\Delta\lambda_m$ and the wavelength spacing $\Delta\lambda_1$, between the Bragg resonance and the first cladding mode resonance (cladding mode offset). Preferably the interior cladding is sufficiently close to the core that the cladding mode offset is at least 20 nm and even more preferably 40 nm.

For a grating which transmits a longest wavelength $\lambda_{max}$, the gaps 30 comprise holes of maximum cross-sectional dimension in the range 1–25 $\lambda_{max}$. They are disposed peripherally around the core at a distance of 2–10 $\lambda_{max}$ from the core center. For a grating receiving 1.5–1.6 $\mu$m light, the gaps could be circles of diameter 1.5–37.5 $\mu$m disposed in a circular ring of radius 3.0–15 $\mu$m from the core center to the edge of the gaps.

If $\mu_{min}$ is the shortest wavelength to be transmitted, the gaps are spaced apart around the periphery of the core so that the thin silica webs 31 between them have a thickness less than $\mu_{min}$ and preferably less than 0.5 $\mu_{min}$. Thus for the grating above, the webs would have a thickness of less than 1.5 $\mu$m and preferably less than 0.75 $\mu$m.

Figure 4:
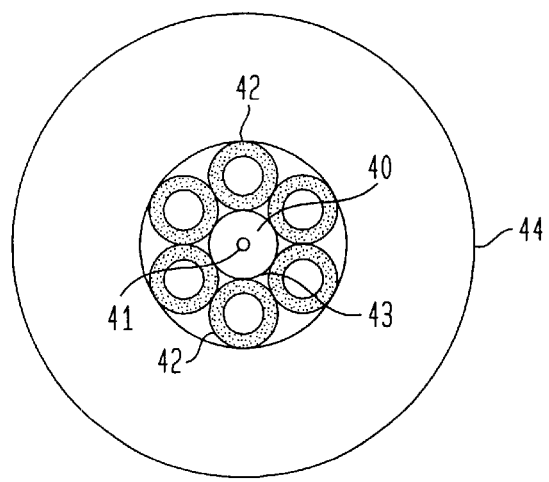
FIG. 4 illustrates an arrangement for making an optical fiber preform for drawing the fiber of FIG. 3.

The fiber can be drawn from an appropriate fiber preform. FIG. 4 illustrates an arrangement for making such a preform. The preform is fabricated by taking a core rod 40 including a core region 41 and surrounding it by silica tubes 42 such that the tubes touch one another and all the tubes 42 touch the core rod 40. The easiest preform to make is when the tubes and core rod are of the same diameter. In this case it takes six tubes to surround the core rod, forming a close packed arrangement. The core rod can have any index profile desired and can be doped with any photosensitive elements. It can also but not necessarily include a cladding region 43. The core rod is made by standard MCVD techniques and then drawn to the appropriate diameter (typically around 1 mm in diameter). The tubes 42 are closed off at one end and then the tube-core-rod bundle is overclad by an overcladding tube 44 using standard overclad techniques. The preform is then drawn into fiber under standard conditions. In the resulting fiber, the inner cladding consists of the silica from the core rod (if any is present) and from the thickness of the walls of silica tubes 42. After the fiber is drawn, Bragg gratings are written in the core by ultraviolet radiation in the conventional manner.

After the grating is formed, the air gaps 30 can optionally be filled with lossy polymers or reflective material. Suitable polymers include fluorinated polymers such as fluoroacrylates and fluoromethacrylates and their copolymers with hydrogen-based acrylates, fluorinated urethanes and silicon-based polymers such as siloxanes. In the case of fluorinecontaining polymers, the refractive index can be adjusted by changing the fluorine content in the polymer molecule. In the case of siloxanes, the refractive index is adjusted by changing the ratio of methyl to phenyl groups attached to the siloxane chain. The polymers can be infused into the airgaps 30 by vacuum assisted capillary action.

Suitable reflectors include metals such as gold, indium, aluminum and nickel. They provide a barrier through which the cladding modes cannot tunnel.

In the above devices it is possible that the region within the peripheral gaps 30 will be smaller or larger than the core of a fiber to which the device is to be joined. In such instances, the two different fibers should be joined by an adiabatic taper section. It is also possible to taper the air-gaps 30, in effect tapering the waveguide adiabatically, and thereby allowing a large mode in conventional fiber to match well to the fiber of the improved grating.

The invention can now be more clearly understood by consideration of the following specific example.

EXAMPLE

Figure 5:
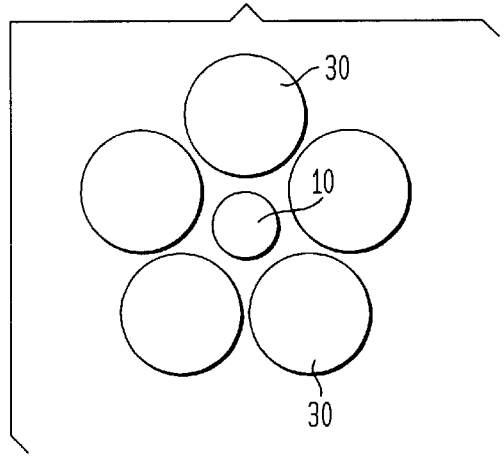
FIG. 5 is a chematic axial cross section of an exemplary improved grating in accordance with FIG. 3.

FIG. 5 shows a schematic cross section of the central region of the high-delta microstructured fiber designed to reduce cladding mode loss in a fiber Bragg grating.("FBG"). (The boundary of the outer cladding glass is not shown, as it would be off the page.) This high-delta microstructured optical fiber had a photosensitive germanium core 10 of radius ~1 $\mu$m and $\Delta=(n_{co}-n_{clad})/n_{core}$~0.5%, where $n_{co}$ and $n_{clad}$ are the refractive index of the germanium core and the inner silica cladding, respectively. Approximately 2 $\mu$m from the center of the core 10 are five air-holes 30 approximately 7 $\mu$m in diameter. The outer silica cladding (not shown) extends to a diameter of 175 $\mu$m. In this fiber the air-holes are exploited to directly manipulate the core mode as well as to isolate the cladding modes from the central core region and only a single layer of air-holes is required for guidance.

In making the grating of FIG. 5, a length of the fiber was first loaded with deuterium to enhance the photosensitivity of the germanium region and then was exposed using 242 nm through a conventional phase mask with a period of $\Lambda_{mask}=1.075$ $\mu$m where $\Lambda_{FBG}=\Lambda_{mask}/2$. This produced a peak index modulation of $\Delta n$~$10^{-5}$.

Figure 6:
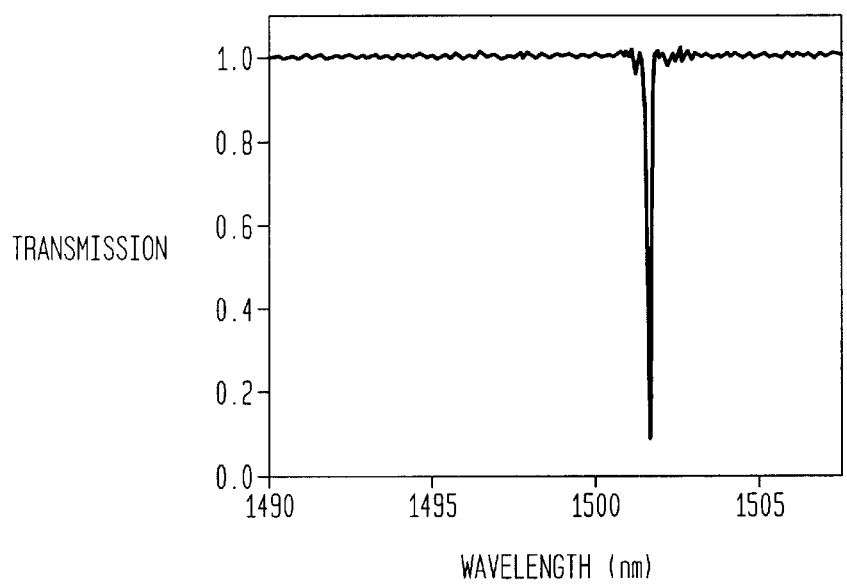
FIG. 6 is a transmission spectrum of the FIG. 5 device.

The transmission spectrum of the FIG. 5 device is shown in FIG. 6. Note that the resonant wavelength occurs at approximately 1505 nm. Using the Bragg condition we estimate the effective index of the core mode to be approximately $n_{eff}\cong1.40$, which is well below that of silica. The low effective index of the core mode is due to the strong overlap of the core mode with the closely spaced air-holes, and is indicative of the significant waveguide contribution to the dispersion of this fiber. Also note from FIG. 6 the absence of cladding mode loss for this range of wavelengths. Because of the small effective inner cladding diameter of this fiber, the cladding modes are offset significantly from the Bragg resonance.

Figure 7:
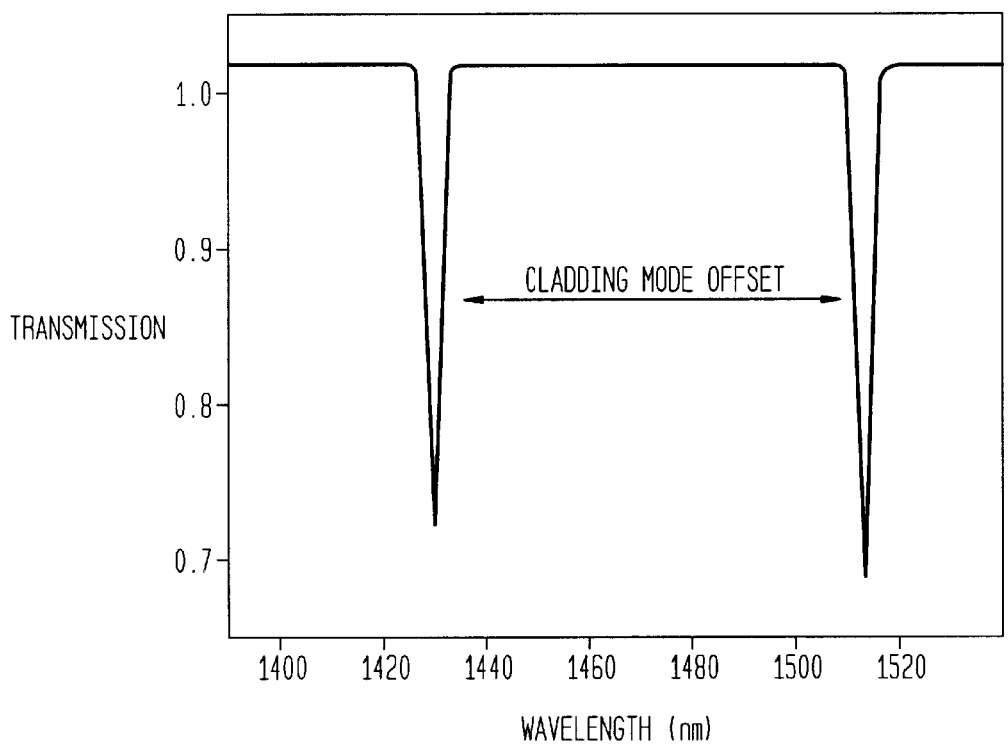
FIG. 7 illustrates a computed extended transmission spectrum of the FIG. 5 device.

To locate the first cladding mode resonance, the fiber was modeled using beam-propagation method simulation software where the central region was considered surrounded by infinite silica cladding. The computed transmission spectrum, in FIG. 7, shows a core mode with an effective index of $n_{eff}=1.405$, and the corresponding Bragg resonance at 1510 nm, in good agreement with the experimental measurements described above. The simulations also show a second mode confined to this inner cladding region with an effective index of $n_{eff}=1.25$. Indeed the difference between the lowest order modes of this inner cladding is $\Delta$~10%, is much larger than the core-cladding index step in standard fiber. The corresponding cladding mode spectrum in this fiber is offset from the Bragg resonance by as much as 80 nm, consistent with the measured grating spectra. Further simulations of the entire fiber structure (where the glass-air interface was incorporated into the simulation) indicate that the core guided mode is not the fundamental mode of the fiber, that is there exist cladding modes with energy in the outer cladding region that have propagation constants higher than the core mode. These cladding modes (with $n_{eff}>n_{core}$) have negligible spatial overlap with the grating in the central core region and thus are not excited by interaction of core guided light with the grating. Alternatively, grating scattered light is confined within the core region due to total internal reflection off of the inner air-silica boundary.

The improved gratings can be unchirped or chirped and fixed in Bragg resonance or tunable. They can be unchirped with nearly identical spacings between perturbations to reflect a narrow band of wavelengths. Alternatively they can be chirped with varying spacing between perturbations to reflect a broader band of wavelengths. See U.S. Pat. No. 5,694,248, issued to T. Erdogan et al. on which is incorporated herein by reference. In chirped form the gratings can also be used as dispersion compensators. The improved gratings can be fixed in wavelength or they can be tunable by the application of strain or heat. See U.S. patent application Ser. No. 09/237,123 U.S. Pat. No. 6,169,831 filed by applicant B. J. Eggleton et al on Jan. 26, 1999 and entitled "Method of Making Optical Chirped Grating With An Intrinsically Chirped Grating and External Gradient" which is incorporated herein by reference.

Figure 8:
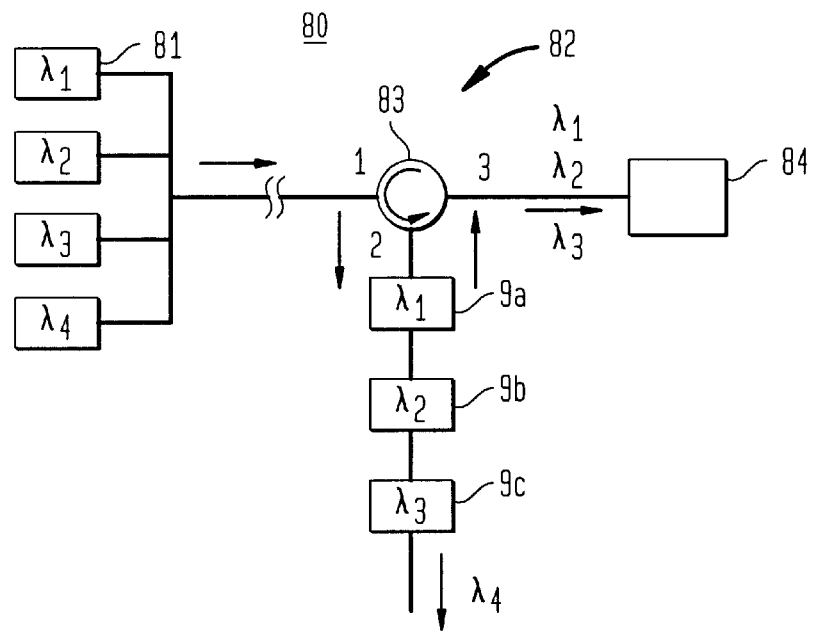
FIG. 8 is a schematic diagram of an add/drop filter arrangement using the improved gratings.

There are numerous important applications for the improved gratings in optical fiber communication systems. FIG. 8 schematically illustrates a simplified communication system 80 using the improved gratings 9 for add/drop filtering. The system 80 comprises a transmitter 81, a receiver 84 and an add/drop filter 82 comprising an optical circulator 83 and one or more improved gratings 9(a)–9(c). Here the gratings are typically unchirped. If the transmitter transmits four wavelengths $\lambda_1$–$\lambda_4$ and the gratings 9(a)–9(c) reflect wavelengths $\lambda_1$–$\lambda_3$, respectively, then $\lambda_4$ will be dropped from the transmitted signal. If broadband or tunable gratings are used, then the number of gratings 9 can be reduced. The improved gratings are particularly useful in such cascaded or broadband filters as short wavelength loss is a problem with them.

Figure 9:
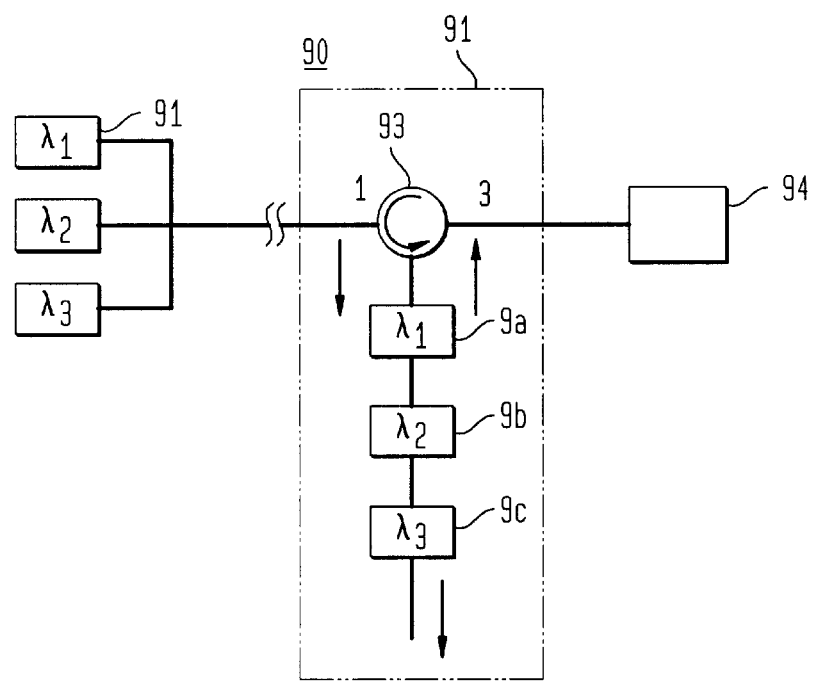
FIG. 9 is a diagram of a dispersion compensation arrangement using the improved gratings.

FIG. 9 schematically illustrates a simplified communication system 90 employing a dispersion compensating module using the improved gratings. The system comprises a transmitter 91, a receiver 94 and the module 92. The module 92 comprises an optical circulator 93 and one or more improved gratings 9(a)–9(c) for dispersion compensation. The gratings are chirped and preferably tunable. The order in which the gratings may be placed in the module depends on the chromatic dispersion that has accumulated in the system before reaching the module. For example, if the accumulated dispersion for channel $\lambda_1$ is greater than that for channel $\lambda_3$, then the gratings are arranged in the order shown, i.e. the first compensating grating is at $\lambda_1$ and the last is at $\lambda_3$. If the accumulated dispersion for the channel at $\lambda_1$ is less than that for $\lambda_3$, then the gratings should be arranged in the reverse order. Alternatively, instead of a plurality of gratings 9(a)–9(c), a single broadband tunable chirped grating can be used.

It is to be understood that the above-described embodiments are illustrative of only a few of the many possible specific embodiments which can represent applications of the principles of the invention. Numerous and varied other arrangements can be readily devised by those skilled in the art without departing from the spirit and scope of the invention.

What is claimed is:

1. In an optical Bragg grating device comprising a length of optical fiber having a core, a Bragg grating formed along the core, and a cladding peripherally surrounding the core, the improvement wherein a plurality of longitudinally extending internal gaps are disposed in the cladding peripherally surrounding the core, the gaps spaced sufficiently close together to prevent the passage of light between them and disposed peripherally around the core to form an interior cladding region reducing short wavelength cladding mode loss in the grating.

2. The grating device of claim 1 wherein the interior cladding region is sufficiently close to the core that the cladding mode offset between the Bragg resonance and the first cladding mode resonance is at least 20 nm.

3. The grating device of claim 1 wherein the interior cladding region is sufficiently close to the core that the cladding mode offset between the Bragg resonance and the first cladding mode resonance is at least 40 nm.

4. The grating device of claim 1 wherein the gaps are disposed around the core at a distance of 2–10 $\lambda_{max}$ from the core center where $\lambda_{max}$ is the longest wavelength to be transmitted.

5. The grating device of claim 1 wherein the gaps comprise holes of maximum dimension in the range 1–25 $\lambda_{max}$ where $\lambda_{max}$ is the longest wavelength to be transmitted.

6. The improved grating device of claim 1 wherein the gaps are filled with polymer.

7. The improved grating device of claim 1 wherein the gaps are filled with reflective material.

8. The improved grating device of claim 1 wherein the gaps are filled with metal.

9. The improved grating device of claim 1 wherein the core comprises Germania-doped silica and the cladding comprises silica.

10. The grating device of claim 1 wherein the gaps peripherally surrounding the core are disposed adjacent one another so that they are spaced apart by thin glass webs having a maximum thickness of less than $\lambda_{min}$ where $\lambda_{min}$ is the shortest wavelength to be transmitted.

11. An add/drop filter comprising the improved filter of claim 1.

12. A dispersion compensator comprising the improved filter of claim 1.

* * * * *